July 17, 1962 C. ZELNICK 3,044,731
TAPE MEASURE CONSTRUCTION
Filed Sept. 2, 1959 2 Sheets-Sheet 1

*INVENTOR.*
CHARLES ZELNICK
BY
ATTORNEYS

July 17, 1962 C. ZELNICK 3,044,731
TAPE MEASURE CONSTRUCTION
Filed Sept. 2, 1959 2 Sheets-Sheet 2

INVENTOR.
CHARLES ZELNICK
BY
ATTORNEYS

United States Patent Office 3,044,731
Patented July 17, 1962

3,044,731
TAPE MEASURE CONSTRUCTION
Charles Zelnick, Saginaw, Mich., assignor to The Lufkin Rule Company, Saginaw, Mich., a corporation of Michigan
Filed Sept. 2, 1959, Ser. No. 837,700
3 Claims. (Cl. 242—84.8)

This invention relates to tape measure and like constructions of the kind wherein a tape is coiled within a casing on a winding drum and is adapted to be withdrawn from the latter by being pulled through an opening in the casing, and which also is adapted to be returned to the casing by rotation of a winding crank or handle.

An object of this invention is to provide a tape measure construction of the kind referred to wherein the winding crank is selectively engageable with and disengageable from the winding drum on which the tape is wound so as to permit the winding drum to be rotated by rotation of the winding crank or, alternatively, to permit rotation of the winding crank without corresponding rotation of the winding drum.

Another object of the invention is to provide a differential speed, drive transmission unit between the winding crank and the winding drum which is so constructed and arranged as to permit rapid rotation of the winding drum even though the winding crank is rotated relatively slowly.

A further object of the invention is to provide means between the crank or the winding drum and the drive transmission unit which permits selective engagement and disengagement of the drive transmission unit with and from one of the crank or drum members.

Another object of the invention is to provide a tape measure construction having a winding crank handle capable of being folded so as to reduce the overall dimensions of the construction, and in which the tape winding drum normally is disengaged from the winding handle so as to permit the tape to be withdrawn from its casing without necessitating unfolding of the handle.

A further object of the invention is to provide a tape measure construction having a gear transmission unit between the tape winding drum and the crank and in which all the parts of the transmission unit are located within the tape winding drum so as to maintain the lateral dimensions of the construction at a minimum.

Other objects and advantages of the invention will be pointed out specifically or will become apparent from the following description when it is considered in conjunction with the appended claims and the accompanying drawings, in which:

Figure 2:
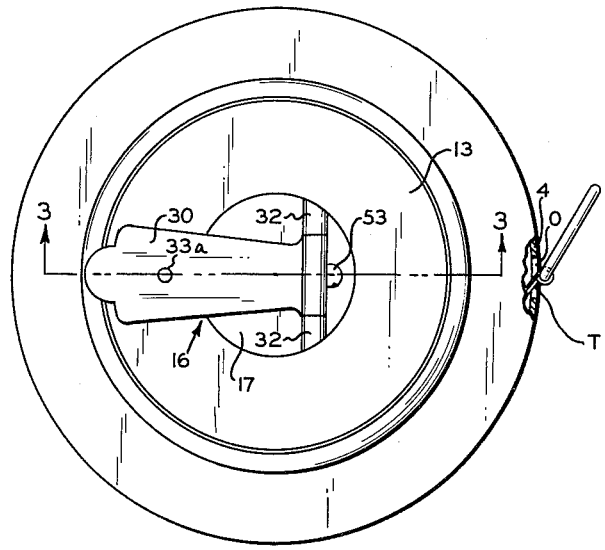
FIGURE 2 is a top plan view of the structure shown in FIGURE 1.
Figure 1:
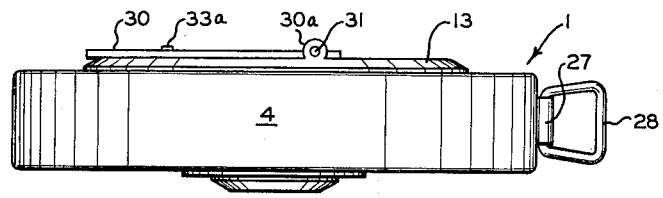
FIGURE 1 is a side elevational view of a tape measure construction formed in accordance with the invention and showing the crank handle in folded position.
Figure 4:
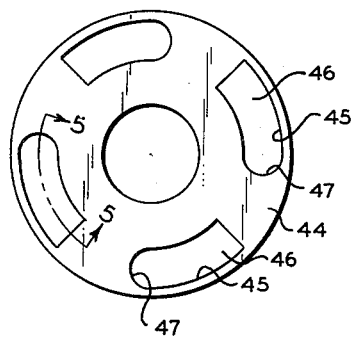
FIGURE 4 is a top plan view of a portion of the mechanism which permits selective driving engagement and disengagement of the crank handle.

Apparatus constructed in accordance with the invention is particularly adapted for use in conjunction with a tape measure construction having a generally cylindrical, hollow casing 1 having side walls 2 and 3 interconnected by a peripheral wall 4. The side wall 3 is provided with a central opening 5 in which is mounted a bushing 6 having a peripheral flange 7 seated upon a plate 8 surrounding the opening 5. The bushing 6 is centrally bored as at 9 to receive a headed, externally threaded screw 10, the head of the screw being received in a counterbore 11 formed in the bushing 6.

The opposite side wall 2 is provided with a large, central opening 12 in which is mounted a plate 13 having a peripheral flange 14 which overlies the wall 2. The plate 13 has a central, shouldered opening 15 in which is rotatably mounted a crank member assembly designated generally by the reference character 16.

The assembly 16 includes a cylindrical body 17 having a peripheral flange 18 which seats on the shoulder of the opening 15. Integral with the body 17 is a centrally located, hollow tube or stem 19 having internal threads adjacent to its free end adapted to receive the threaded shank of the screw 10. The construction and arrangement of the parts thus far described are such that the screw 10, when threaded into the stem 19, maintains the crank member assembly 16 and its associated parts in assembled, rotatable relation with the casing 1.

Between the side walls of the casing 1 is located a generally cup-shaped winding drum member generally designated 20 and having a side wall 21 and a peripheral wall 22. The side wall 21 includes an inwardly offset portion 23 at the center of which is staked or otherwise suitably fixed a gear 24 having peripheral teeth 25. The winding drum 20 and the gear are provided with a central opening 26 in which is rotatably received the stem 19, the latter serving as a journal for the drum 20. Fixed to the peripheral wall 22 of the drum in any conventional manner is one end of a steel or other material measuring tape or line T. The tape T is coiled around the periphery of the drum 20 and its other end extends through an opening O (FIGURE 2) formed in the peripheral wall 4 of the casing in the usual manner. The projecting end of the tape T is riveted or otherwise suitably fixed to a clasp 27 in which is retained a ring 28 of conventional construction.

The construction of the drum 20 and the tape T is such that a person pulling on the ring 28 will cause the drum 20 to rotate so as to permit the tape T to be withdrawn from the casing. In order to prevent coasting or overrunning of the drum when the pulling force on the tape is released, a cup-shaped spring member 29 is interposed between the bushing 6 and the outer surface of the drum wall 23 to exert a light retarding force on the drum.

The crank member 16 includes an arm 30 having a rounded enlargement 30a at one end which is pivoted by means of a pin 31 between a pair of upstanding ears 32 formed on the body 17. The arm 30 thus may be swung from the full line position shown in FIGURE 3 to the chain line position shown in FIGURE 6 where it then is capable of rotating the body 17. To facilitate rotation of the body 17, the arm 30 is provided with a handle 33 which is rotatably mounted on a stud 33a fixed to the arm 30. In order to maintain the lateral dimensions of the construction as compact as possible, the handle 33 is so arranged that it is located at a somewhat shorter distance from the axis of rotation of the drum 20 than is the drum wall 22. The plate 13 is provided with an opening 34 which is so located as to permit passage of the handle 33 into the drum 20 when the arm 30 is folded about its hinge 31.

Figure 3:
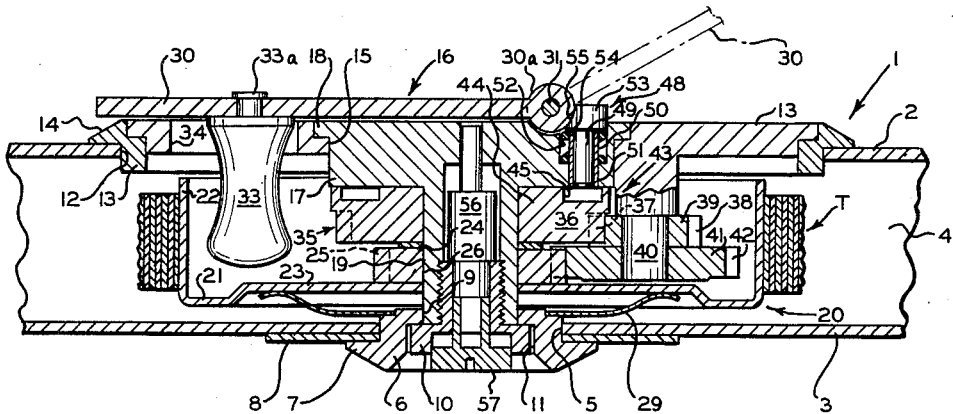
FIGURE 3 is an enlarged, sectional view taken on the line 3—3 of FIGURE 2.

When it is desired to retract the tape T into the casing 1, the winding crank apparatus 16 must be rotated. Transmission means designated generally by the reference character 35 is provided for transmitting rotary motion of the crank 16 to the winding drum 20. The transmission means 35 comprises a driving gear 36 which is rotatably mounted on the stem 19 of the body 17. As is best shown in FIGURE 3, the teeth 37 of the member 36 mesh with the teeth 38 of a smaller gear 39 which is rotatably mounted on a stub shaft 40 which projects from the plate 13 into the drum 20. The gear 39 is staked or otherwise suitably fixed to a larger gear 41 which also is rotatably mounted on the stub shaft 40 and which has teeth 42 in mesh with the teeth 25 of the gear 24 which is fixed to the drum 20.

The arrangement of the transmission gears is such that upon rotation of the gear 36, under circumstances yet to be described, the gears 39 and 41 will be rotated and, consequently, gear 24 and the drum 20 also will be rotated. Preferably, the relative sizes of the gears of the transmission unit are such that the drum 20 will rotate about three times as fast as the gear 36. This ratio may be achieved by forming the gear 36 with a 1 inch pitch diameter and 32 teeth, by forming the gear 39 with a .375 inch pitch diameter and 12 teeth, by forming the gear 41 with a pitch diameter of .688 inch and 22 teeth, and by making the gear 24 identical to the gear 41. It will be understood that the gear sizes referred to herein are illustrative only and that different size gears may be incorporated in the apparatus to provide any desired ratio between the speed of the drum and the speed of the driving gear.

Figure 5:
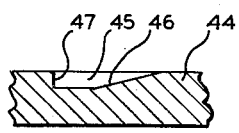
FIGURE 5 is a sectional view taken on the line 5—5 of FIGURE 4.

In the disclosed embodiment of the invention, a mechanism designated generally by the reference character 43 is interposed between the transmission unit 35 and the winding crank 16. In the preferred form, the mechanism 43 comprises a ratchet wheel 44 which, in the disclosed embodiment, forms an integral part of the gear 36, but which may be separately formed from the gear but rigidly secured to the latter in any suitable manner. The outer face of the wheel 44 is provided with a plurality of recesses 45, each of which comprises a gradually sloping base 46 terminating in an abrupt wall 47, as is best seen in FIGURE 5. In the disclosed embodiment of the invention there are four such recesses 45, but more or less may be provided, as desired.

Means for operating the members comprises a plunger 48 having a stem 49 surrounded by a sleeve 50, both the stem and the sleeve being reciprocable through an opening 51 formed in the plate 13 and so located that the stem 49 registers with the recesses 45. The plate 13 is counterbored as at 52 to accommodate the head 53 of the plunger. The plunger normally is biased to a position out of engagement with the curved plate 44 by means of a spring 54 interposed between the base of the counterbore 52 and the head 53. The head 53 of the plunger is relieved as at 55 to correspond substantially to the curvature of the enlargement 30a of the arm 30, the arrangement being such that the plunger 48 is prevented from dropping out of the opening 51 due to engagement between the head 53 and the enlargement 30a.

Figure 6:
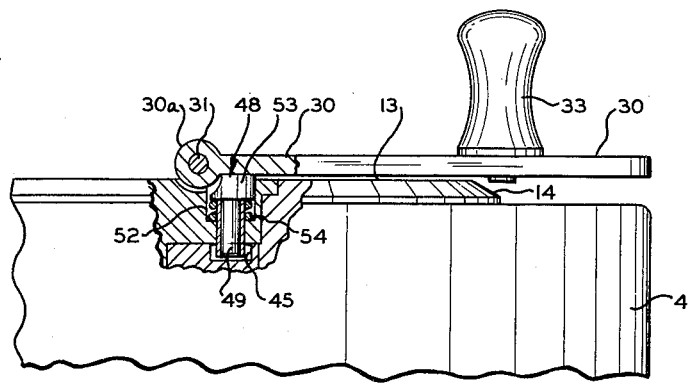
FIGURE 6 is a view similar to FIGURE 3, but illustrating the crank handle in unfolded position.

When the plunger 48 is in its outwardly biased position, the head 53 projects beyond the outer surface of the plate 13 so as to lie in the path of the arm 30 as the latter is swing towards the position shown in FIGURE 6. The point at which the arm 30 initially engages the top of the plunger 48 is indicated in chain lines in FIGURE 3. As the arm 30 is swung from the chain line position in FIGURE 3 to the position indicated in FIGURE 6, the plunger 48 is depressed so as to project the stem 49 into one of the recesses 45, whereupon there will be a solid connection between the crank and the gear unit 35 to cause rotation of the gears and, consequently, rotation of the drum 20 in such direction as to retract the tape T.

When the tape has been fully retracted, the arm 30 may be swung to its full line position shown in FIGURE 3, that is, towards a position in which the handle 33 would be capable of entering the opening 34 in the plate 13. Inasmuch as the arm 30 will have been rotated relatively to the plate 13 during the retraction of the tape, however, usually the handle 33 will not register with the opening 34. Inasmuch as the mechanism 43 will have been disengaged from the transmission 35 upon swinging movement of the arm 30 away from the position shown in FIGURE 6, however, the arm 30 and its associated crank apparatus may be rotated freely in either direction so as to register the handle 33 with the opening 34 and without causing any rotation of the drum 20.

Tape measure constructions of the kind with which the invention is concerned customarily include a spring device which releasably engages the handle 33 to prevent inadvertent swinging of the arm 30. Such a spring device may be included in the present construction, but is not shown in the interests of clarity of the drawings and because it forms no part of the invention per se. With such constructions, however, it is desirable to furnish means for facilitating release of the handle 33 and in the present construction such means is provided by locating a shouldered pin 56 in openings formed in the body 17, in the stem 19, and in the screw 10. The pin 56 may be force fitted to a push button 57 which may be pressed to project the pin 56 partially through the assembly so that its opposite end bears against the arm 30 and initiates swinging of the arm toward the position shown in FIGURE 6. The push pin construction per se forms no part of the invention, but it is to be observed that the push pin construction is readily adaptable to the structure of the invention.

The disclosed embodiment is representative of presently preferred forms of the invention but is intended to be illustrative rather than definitive thereof. The invention is defined in the claims.

I claim:

1. A tape measure construction comprising a casing; a generally disc-shaped winding drum member journaled in said casing for rotation relative thereto, said drum member having a side with an opening therein; a line operatively connected with said drum member and extensible and retractable relatively to said drum member upon rotation thereof; a crank member journaled in said casing adjacent the said side of said drum member for rotation relative to said casing, said crank member including an arm pivoted for swinging movements between first and second position; speed differential transmission means interposed between said members and contained within said drum member for driving said drum member in response to rotation of said crank member but at a different speed; and mechanism extending through the opening in said drum member, and including a drive part coaxial with said drum connected with said transmission means and a part engageable and disengageable with said drive part, interposed between said transmission means and crank member and operable in response to swinging movements of said arm to and from said positions for engaging and disengaging said transmission means with and from said members.

2. A tape measure construction comprising a casing with an axially disposed spindle; a generally cup-shaped winding drum member journaled in said casing on said spindle for rotation thereon, said drum member having an open side, a line operatively connected with said drum member and extensible and retractable relatively to said drum member upon rotation thereof; a crank member journaled in said casing adjacent the open side of said drum member for rotation relative to said casing, said crank member including an arm pivoted for swinging movements between first and second position; speed differential transmission means interposed between said members and contained within said drum member for driving said drum member in response to rotation of said crank member but at an increased speed; a drive wheel on said spindle, co-axial with said drum but free to rotate relative to said drum, in driving engagement with said transmission means; and a drive pin, offset axially relative to said spindle and driveable in a circumferential path upon rotation of said handle, engageable and disengageable with said drive wheel in response to swinging movements of said arm to and from said positions, for engaging and disengaging said pin and wheel and thereby said transmission means with and from said members.

3. A tape measure construction comprising a casing with an axially disposed spindle; a generally cup-shaped winding drum member journaled in said casing on said spindle for rotation relative thereto, said drum member having an open side; a line operatively connected with said drum member and extensible and retractable relatively to said drum member upon rotation thereof; a crank member journaled in said casing adjacent the open side of said drum member for rotation relative to said casing, said crank member including an arm pivoted for swinging movements between first and second position; a drive gear on said spindle, co-axial with and within said drum, but free to rotate relative to said drum; a drive pin, offset axially relative to said spindle and driveable in a circumferential path upon rotation of said handle, engageable and disengageable with said drive gear in response to swinging movements of said arm to and from said position; a jack shaft extending from said casing through the open side of said drum; a gear of small diameter relative to said drive gear and drivingly connected thereto mounted within said drum on said jack shaft; a larger gear relative to said small diameter gear on said jack shaft; and a second small diameter gear on said spindle drivingly connected with said larger gear and fixed to said drum.

References Cited in the file of this patent

UNITED STATES PATENTS

| | | |
|---|---|---|
| 1,069,593 | Weaver et al. | Aug. 5, 1913 |
| 1,274,471 | Todd | Aug. 6, 1918 |
| 2,268,178 | Boisture | Dec. 30, 1941 |

FOREIGN PATENTS

| | | |
|---|---|---|
| 936,536 | Germany | Dec. 15, 1955 |